US005384197A

United States Patent [19]

Koyama et al.

[11] Patent Number: 5,384,197

[45] Date of Patent: Jan. 24, 1995

[54] SUPERCONDUCTING MAGNET COIL AND CURABLE RESIN COMPOSITION USED THEREIN

[75] Inventors: Toru Koyama, Hitachi; Koo Honjo, Ibaraki; Masao Suzuki, Hitachi; Akio Takahashi, Hitachiota; Akio Mukoh, Mito; Keiji Fukushi; Seiji Numata, both of Hitachi, all of Japan

[73] Assignee: Hitachi, Ltd., Tokyo, Japan

[21] Appl. No.: 171,780

[22] Filed: Dec. 22, 1993

Related U.S. Application Data

[63] Continuation of Ser. No. 799,964, Nov. 29, 1991, abandoned.

[30] Foreign Application Priority Data

Nov. 30, 1990 [JP] Japan .................................. 2-329058

[51] Int. Cl.[6] .................................................. B32B 9/00

[52] U.S. Cl. ................................ 428/457; 428/473.5; 428/474.4; 428/458; 428/930; 505/884; 505/887; 505/813; 505/705; 174/125.1; 335/216

[58] Field of Search .................. 428/457, 473.5, 474.4, 428/458, 930, 684; 505/884, 887, 813, 705; 174/125.1; 335/216

[56] References Cited

U.S. PATENT DOCUMENTS

| | | | |
|---|---|---|---|
| 4,595,898 | 6/1986 | Shiraki | 505/887 |
| 5,047,741 | 9/1991 | Laskaris | 335/216 |
| 5,168,259 | 12/1992 | Takemura | 505/880 |
| 5,177,056 | 1/1993 | Hilti | 505/785 |

FOREIGN PATENT DOCUMENTS

| | | |
|---|---|---|
| 0076887 | 4/1983 | European Pat. Off. . |
| 1441588 | 5/1966 | France . |

OTHER PUBLICATIONS

Sahu "Chemistry of High T Superconductors II", ACS, 1988, Chapter 1.

Superconductors Materials Problems, Science Apr. 1, 1988, vol. 240, pp. 25–27.

"Superconducting Magnets," Wilson, Clarendon Press, Oxford 1983, pp. 310–330.

Patent Abstracts of Japan, vol. 11, No. 127 (E-501)(2574) Apr. 21, 1987 & Jp-61 272 902 (Hitachi Ltd) Dec. 3, 1986.

IEEE Transactions on Magnetics, vol. 17, No. 5, Sep. 1981, N.Y. US "Cause of Quenching in Epoxy Impregnated Coils", pp. 1799–1802.

Experimental and theoretical investigation of mechanical disturbances in epoxy-impregnated superconducting coils Bobrov et al—Cryogenic 1985 vol. 25, Jun. pp. 307–316.

"Stress-induced epoxy cracking and energy release at 4.2 K in epoxy-coated superconducting wires" Yasaka et al pp. 423–428 Cryogenics (Aug. 1984).

"Experimental study of energy release due to cracking of epoxy impregnated conductors" Yanagi et al pp. 753–757 Cryogenics 1989 vol. 29 Jul.

*Primary Examiner*—Patrick J. Ryan
*Assistant Examiner*—Patrick Jewik
*Attorney, Agent, or Firm*—Antonelli, Terry, Stout & Kraus

[57] ABSTRACT

A superconducting magnet coil contains a coil of superconducting wire and a cured product of a curable resin composition with which the coil has been impregnated, the cured product having a thermal shrinkage factor of 1.5–0.3%, preferably 1.0–0.3%, when cooled from the glass transition temperature to 4.2K, a bend-breaking strain of 2.9–3.9%, preferably 3.2–3.9%, at 4.2K and a modulus of 500–1,000 $kg/mm^2$ at 4.2K, or undergoing a thermal stress of 0–10 $kg/mm^2$ when cooled from the glass transition temperature to 4.2K and resisting to quench during superconducting operation. It is produced by winding a superconducting wire to form a coil; impregnating the coil with a curable resin composition of low viscosity which contains for example at least one epoxy resin selected from the group consisting of diglycidyl ether of bisphenol A, diglycidyl ether of bisphenol F and diglycidyl ether of bisphenol AF, all having a number-average molecular weight of 350–1,000, a flexibilizer and a curing catalyst, to obtain a curable-resin-composition-impregnated coil; and heating the curable-resin-composition-impregnated coil to cure the composition.

10 Claims, 2 Drawing Sheets

SUPERCONDUCTING MAGNET COIL AND CURABLE RESIN COMPOSITION USED THEREIN

This application is a continuation of application Ser. No. 07/799,964, filed Nov. 29, 1991, now abandoned.

BACKGROUND OF THE INVENTION (1) Field of the Invention

The present invention relates to a superconducting magnet coil, an insulating layer thereof and a curable resin composition used in the superconducting magnet coil.

(2) Description of the Prior Art

In a superconducting magnet coil used, by being dipped in liquid helium, in linear motor cars, superconducting electromagnetic propulsion vessels, nuclear fusion reactors, superconducting generators, MRI, pion applicators (for therapy), electron microscopes, energy storage apparatuses, etc., the superconducting wires contained in the coil cause a temperature increase incurred by frictional heat or the like when the superconducting wires are moved by an electromagnetic force or a mechanical force. As a result, the magnet may shift from a superconducting state to a state of normal conduction. This phenomenon is called a quench phenomenon. Hence, it is conducted in some cases to fill the gap between the wires of the coil with a resin such as epoxy resins or the like to fix the wires.

The resin, such as epoxy resins or the like, used for filling the coil gap usually has a thermal shrinkage factor of 1.8–3.0% when cooled from the glass transition temperature to a liquid helium temperature, i.e. 4.2K. Meanwhile, the superconducting wires have a thermal shrinkage factor of about 0.3–0.4% under the same condition. As Y. Iwasa et al. describe in Cryogenics Vol. 25, pp. 304–326 (1985), when a superconducting magnet coil comprising superconducting wires and a resin used for filling the gap between the wires is cooled to a liquid helium temperature, i.e. 4.2K, a residual thermal stress appears due to the difference in thermal shrinkage factor between the superconducting wires and the resin. As a result, microcracks of several microns appear in the resin, a temperature increase of several degrees is induced at the peripheries of the microcracks due to the releasing energy of the residual thermal stress of the resin, and the superconducting wires show a sharp rise in resistance. Finally, the superconducting magnet coil shifts from a superconducting state to a state of normal conduction and causes an undesirable phenomenon called "quench". Further, at the liquid helium temperature (4.2K), the impregnant resin such as epoxy resins or the like gets very brittle and produces microcracks of several microns, due to an electromagnetic force or a mechanical force. The releasing energy from the microcracks gives rise to a temperature increase of several degrees at the peripheries of the microcracks. Thus, the superconducting wires show a sharp rise in resistance, the superconducting magnet coil shifts from a superconducting state to a state of normal conduction and disadvantageously causes quench.

SUMMARY OF THE INVENTION

The present invention has been made in view of the above situation. The objects of the present invention are to provide a superconducting magnet coil which is resistant to microcrack generation of impregnant resin and causes substantially no quench during operation; an insulating layer thereof; and a curable resin composition used in the superconducting magnet coil.

The objects of the present invention can be achieved by using, as a resin for impregnation of superconducting magnet coil, a curable resin composition capable of giving a cured product having a thermal shrinkage factor of 1.5–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K, particularly a cured product having a thermal shrinkage factor of 1.0–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K.

The present invention is briefly described as follows. The first aspect of the present invention relates to a superconducting magnet coil which is impregnated with a curable resin composition capable of giving a cured product having a thermal shrinkage factor of 1.5–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K, particularly a cured product having a thermal shrinkage factor of 1.0–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K.

The second aspect of the present invention relates to a resin used for impregnation of superconducting magnet coil, that is, a curable resin composition capable of giving a cured product having a thermal shrinkage factor of 1.5–0.3% when cooled from the glass transition temperature to a liquid helium temperature, i.e. 4.2K, a bend-breaking strain of 2.9–4.5% at 4.2K and a modulus of 500–1,000 kg/mm$^2$ at 4.2K, particularly a cured product having a thermal shrinkage factor of 1.0–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K.

The third aspect of the present invention relates to a process for producing a superconducting magnet coil which comprises a coil of superconducting wire and a cured product of a curable resin composition with which the coil has been impregnated, which process comprises the steps of:

(a) winding a superconducting wire to form a coil, (b) filling the gap between the superconductors of the coil with a curable resin composition having a viscosity of 0.01–10 poises at the time of filling to obtain a curable-resin-composition-impregnated coil, and (c) heating the curable-resin-composition-impregnated coil to cure the composition so as to give a cured product having a thermal shrinkage factor of 1.5–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K, particularly a cured product having a thermal shrinkage factor of 1.0–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K.

The fourth aspect of the present invention relates to an insulating layer of superconducting magnet coil, which is obtained by impregnation of a coil of superconducting wire with a curable resin composition and curing of the resin composition, said resin composition being capable of giving a cured product having a thermal shrinkage factor of 1.5–0.3% when cooled from the glass transition temperature to a liquid helium temperature, i.e. 4.2K, a bend-breaking strain of 2.9–4.5% at 4.2K and a modulus of 500–1.000 kg/mm$^2$ at 4.2K, particularly a cured product having a thermal shrinkage factor of 1.0–0.3% when cooled from the glass transition temperature to a liquid helium temperature, i.e. 4.2K, a bend-breaking strain of 2.9–4.5% at 4.2K and a modulus of 500–1,000 kg/mm$^2$ at 4.2K.

According to the present invention, there are provided:

a superconducting magnet coil which comprises a coil of superconducting wire and a cured product of a curable resin composition with which the coil has been impregnated, the cured product having a thermal shrinkage factor of 1.5–0.3% when cooled from the glass transition temperature to 4.2K, a bend-breaking strain of 2.9–3.9%, preferably 3.2–3.9% at 4.2K and a modulus of 500–1,000 Kg/mm$^2$ at 4.2K;

a superconducting magnet coil which comprises a coil of superconducting wire and a cured product of a curable resin composition with which the coil has been impregnated, the cured product undergoing a thermal stress of 0–10 kg/mm$^2$ when cooled from the glass transition temperature to 4.2K and being resistant to quench during superconducting operation;

a curable resin composition which gives a cured product having a thermal shrinkage factor of 1.5– 0.3%, preferably 1.0–0.3% when cooled from the glass transition temperature to 4.2K, a bend-breaking strain of 2.9–3.9% at 4.2K and a modulus of 500–1,000 kg/mm$^2$ at 4.2K;

a process for producing the superconducting magnet coil which comprises the steps of:

(a) winding a superconducting wire to form a coil, (b) impregnating the coil with a curable resin composition having a viscosity of 0.01–10 poises at the time of filling, for example, the curable resin composition comprising (i) at least one epoxy resin selected from the group consisting of diglycidyl ether of bisphenol A, diglycidyl ether of bisphenol F and diglycidyl ether of bisphenol AF, all having a number-average molecular weight of 350–1,000, (ii) a flexibilizer and (iii) a curing catalyst, so as to fill the gap between the superconductors of the coil with the curable resin composition to obtain a curable-resin-composition-impregnated coil, and (c) heating the curable-resin-composition-impregnated coil to cure the composition to allow the cured product of the composition to have a thermal shrinkage factor of 1.5–0.3%, preferably 1.0–0.3% when cooled from the glass transition temperature to 4.2K, a bend-breaking strain of 2.9–3.9% at 4.2K and a modulus of 500–1,000 kg/mm$^2$ at 4.2K, preferably, the step (b) including the step of covering the outer surface of the coil with a release film or a perforated film, placing the film-covered coil in a mold, and effecting vacuum impregnation, and if necessary pressure impregnation, of the coil with the curable resin composition, preferably, the step (c) including the step of curing the composition under pressure, and if necessary further comprising the step of clamping the curable-resin-composition-impregnated coil before the step of curing;

a superconducting magnet coil which comprises:

(a) a coil of a composite superconductor comprising a plurality of thin superconducting wires and a stabilizer selected from the group consisting of copper and aluminum which is thermally or electrically contacted with the wires, and (b) a cured product of a curable resin composition with which the coil has been impregnated, the cured product having a thermal shrinkage factor of 1.5–0.3% when cooled from the glass transition temperature to 4.2K, a bend-breaking strain of 2.9–3.9% at 4.2K and a modulus of 500–1,000 kg/mm$^2$ at 4.2K;

a superconducting magnet coil which comprises:

(a) a coil of a composite superconductor comprising a plurality of thin superconducting wires and a stabilizer selected from the group consisting of copper and aluminum which is thermally or electrically contacted with the wires, and (b) a cured product of a curable resin composition with which the coil has been impregnated, the cured product undergoing a thermal stress of 0–10 kg/mm$^2$ when cooled from the glass transition temperature to 4.2K and resistant to quench during superconducting operation;

a process for producing the superconducting magnet coil which comprises the steps of:

(a) winding a composite superconductor comprising a plurality of thin superconducting wires and a stabilizer selected from the group consisting of copper and aluminum which is thermally or electrically contacted with the wires to form a coil, (b) filling the gap between the composite superconductors of the coil with a curable resin composition to obtain a curable-resin-composition-impregnated coil, and (c) heating the curable-resin-composition-impregnated coil to cure the composition, the step (a) including the step of subjecting the composite superconductor to surface treatment with a coupling agent before winding the composite superconductor; and an insulating layer of a superconducting magnet coil which comprises:

(a) a coil of a composite superconductor comprising a plurality of thin superconducting wires and a stabilizer selected from the group consisting of copper and aluminum which is thermally or electrically contacted with the wires, and (b) a cured product of a curable resin composition with which the coil has been impregnated, the cured product having a thermal shrinkage factor of 1.5–0.3% when cooled from the glass transition temperature to 4.2K, a bend-breaking strain of 2.9–3.9% at 4.2K and a modulus of 500–1,000 kg/mm$^2$ at 4.2K.

DETAILED DESCRIPTION OF THE INVENTION

Figure 1:
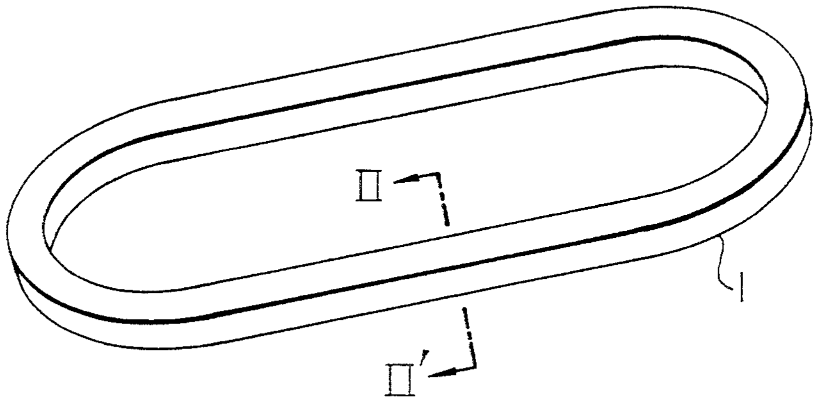
FIG. 1 is a perspective view of a race track-shaped superconducting magnet coil. The numeral 1 is a round superconducting magnet coil.

The curable resin composition according to the present invention can also be preferably used in switches for permanent current which are required in superconducting magnet coils for linear motor cars, MRI, energy storage and nuclear fusions.

The superconducting wire used in the present invention has no particular restriction and can be any wire as long as it has superconductivity. There can be mentioned, for example, alloy superconductors such as Nb—Ti and the like; intermetallic compound superconductors such as $Nb_3Sn$, $Nb_3Al$, $V_3Ga$ and the like; and oxide superconductors such as LaBaCuO, YBaCuO and the like. Ordinarily, the superconducting wire has a composite structure comprising (a) the above superconductor and (2) a metal of normal conduction such as Cu, cupro-nickel (CuNi), CuNi—Cu, Al or the like. That is, the superconducting wire includes an ultrafine multiconductor wire obtained by embedding a large number of thin filament-like superconducting wires into a metal of normal conduction as a matrix, a straight twisted wire obtained by binding a large number of superconducting material wires into a straight bundle and twisting the bundle with the straightness being maintained, a straight wire obtained by embedding a straight superconducting material wire into a straight normal conductor, and an internal cooling type conductor having inside a passage for cooling medium.

The resin for impregnation of superconducting magnet coil, used in the present invention has no particular restriction and can be any resin as long as it can give a cured product having a thermal shrinkage factor of 1.5–0.3% when cooled from the glass transition temperature to a liquid helium temperature, i.e. 4.2K, a bend-breaking strain of 2.9–3.9% at 4.2K and a modulus of 500–1,000 $kg/mm^2$ at 4.2K, particularly a cured product having a thermal shrinkage factor of 1.0–0.3% when cooled from the glass transition temperature to a liquid helium temperature, i.e. 4.2K, a bend-breaking strain of 2.9–3.9% at 4.2K and a modulus of 500–1,000 $kg/mm^2$ at 4.2K.

When the cured product of the resin has a thermal shrinkage factor larger than 1.5% and a modulus larger than 1,000 $kg/mm^2$, the stress applied to the superconducting magnet during the superconducting operation surpasses the strength of the cured product. As a result, the cured product generates cracks, and quench occurs due to the releasing energy of the stress. When the cured product has a thermal shrinkage factor smaller than 0.3%, the stress applied to the superconducting magnet during the superconducting operation surpasses the strength of the cured product due to the difference in thermal shrinkage factor between the cured product and the superconductor of the magnet. As a result, the cured product generates cracks, and quench tends to occur due to the releasing energy of the stress. When the modulus is smaller than 500 $kg/mm^2$, the glass transition temperature tends to be lower than room temperature and, when the superconducting magnet has been returned to room temperature, the cured product generates cracks due to the low strength; when the magnet is recooled to 4.2K and reoperated, the cracks become a nucleus of further crack generation and the superconducting magnet causes quench. When the bend-breaking strain is smaller than 2.9%, the cured product has low adhesion to the superconductor and, after the cooling or during the operation of the superconducting magnet, peeling takes place between the superconductor and the cured product. As a result, thermal conductivity between them is reduced, even slight cracking invites temperature increase, and the superconducting magnet tends to incur quench.

As the method for increasing the bend-breaking strain of a thermosetting resin, that is, for toughening a thermosetting resin, there are a number of methods. In the case of an epoxy resin, for example, there are (1) a method of subjecting an epoxy resin to preliminary polymerization to obtain an epoxy resin having a higher molecular weight between crosslinked sites, (2) a method of adding a flexibilizer (e.g. polyol, phenoxy resin) to an epoxy resin to increase the specific volume of the latter, (3) a method of introducing a soft molecular skeleton into an epoxy resin by using a curing agent such as elastomer-modified epoxy resins, long-chain epoxy resins, long-chain amines, acid anhydrides, mercaptans or the like, (4) a method of using an internal plasticizer such as branched epoxy resins, polyamideamines, dodecyl succinic anhydrides or the like, (5) a method of using, in combination with an epoxy resin, a monofunctional epoxy resin to give rise to internal plasticization, (6) a method of using an epoxy resin as a main component and a curing agent in proportions deviating from the stoichiometric amounts to give rise to internal plasticization, (7) a method of adding a plasticizer (e.g. phthalic acid ester) to give rise to external plasticization, (8) a method of dispersing butadiene rubber particles, silicone rubber particles or the like in an epoxy resin to form an islands-in-a-sea structure, (9) a method of introducing, into an epoxy resin, an acrylic resin, an urethane resin, a polycaprolactone, an unsaturated polyester or the like to form an interpenetrating network structure, i.e. an IPN structure, (10) a method of adding, to an epoxy resin, a polyether having a molecular weight of 1,000–5,000 to form a microvoid structure, and so forth. Of these methods, the methods (1) and (2) are preferable in view of the low thermal shrinkage and high toughness of the improved epoxy resin.

Specific examples of the improved epoxy resin obtained according to the above methods, are an epoxy resin obtained by curing an epoxy resin of high molecular weight with an acid anhydride, an epoxy resin obtained by curing an epoxy resin of high molecular weight with a catalyst alone, an epoxy resin obtained by adding a flexibilizer to an epoxy resin and curing the resin with an acid anhydride, an epoxy resin obtained by adding a flexibilizer to an epoxy resin and curing the resin with a catalyst alone, and a maleimide resin obtained by adding a flexibilizer.

The epoxy resin usable in the present invention can be any epoxy resin as long as it has at least two epoxy groups in the molecule. Such an epoxy resin includes, for example, bifunctional epoxy resins such as diglycidyl ether of bisphenol A, diglycidyl ether of bisphenol F, diglycidyl ether of bisphenol AF, diglycidyl ether of bisphenol AD, diglycidyl ether of hydrogenated bisphenol A, diglycidyl ether of 2,2-(4-hydroxyphenyl)-nonadecane, 4,4'-bis(2,3-epoxypropyl) diphenyl ether, 3,4-epoxycyclohexylmethyl (3,4-epoxy)cyclohexanecarboxylate, 4-(1,2-epoxypropyl)-1,2-epoxycyclohexane, 2-(3,4-epoxy)cyclohexyl-5,5-spiro(3,4-epoxy)-cyclohexane-m-dioxane, 3,4-epoxy-6-methylcyclohexylmethyl-4-epoxy-6-methylcyclohexanecarboxylate, butadiene-modified epoxy resin, urethane-modified epoxy resin, thiol-modified epoxy resin, diglycidyl ether of diethylene glycol, diglycidyl ether of triethylene glycol, diglycidyl ether of polyethylene glycol, diglycidyl ether of polypropylene glycol, diglycidyl ether of 1,4-butanediol, diglycidyl ether of neopentyl glycol, diglycidyl ether of propylene oxide adduct of bisphenol A, diglycidyl ether of ethylene oxide adduct of bisphenol A, and the like; trifunctional epoxy resins such as tris[p-(2,3-epoxypropoxy)phenyl]methane, 1,1,3-tris[p-(2,3-epoxypopoxy)phenyl]butane and the like; and polyfunctional epoxy resins such as glycidylamine (e.g. tetraglycidyldiaminodiphenylmethane, triglycidyl-p-aminophenol, triglycidyl-m-aminophenol, diglycidylamine, tetraglycidyl-m-xylylenediamine, tetraglycidylbisaminomethylcyclohexane), phenolic novolac type epoxy resin, cresol type epoxy resin and the like. It is also possible to use a polyfunctional epoxy resin obtained by reacting epichlorohydrin with at least two polyhydric phenols selected from (a) bis(4-hydroxyphenyl)methane, (b) bis(4-hydroxyphenyl)ethane, (c) bis(4-hydroxyphenyl)propane, (d) tris(4-hydroxyphenyl)alkane and (e) tetrakis(4-hydroxyphenyl)alkane, because the resin has a low viscosity before curing and gives easy working. Specific examples of tris(4-hydroxyphenyl)alkane are tris(4-hydroxyphenyl)methane, tris(4-hydroxyphenyl)ethane, tris(4-hydroxyphenyl)propane, tris(4-hydroxyphenyl)butane, tris(4-hydroxyphenyl)hexane, tris(4-hydroxyphenyl)heptane, tris(4-hydroxyphenyl)octane, tris(4-hydroxyphenyl)nonane, etc. There can also be used tris(4-hydroxyphenyl)alkane derivatives such as tris(4-hydroxydimethylphenyl)methane and the like.

Specific examples of tetrakis(4-hydroxyphenyl)alkane are tetrakis(4-hydroxyphenyl)methane, tetrakis(4-hydroxyphenyl)ethane, tetrakis(4-hydroxyphenyl)propane, tetrakis(4-hydroxyphenyl)butane, tetrakis(4-hydroxyphenyl)hexane, tetrakis(4-hydroxyphenyl) heptane, tetrakis(4-hydroxyphenyl)octane, tetrakis(4-hydroxyphenyl)nonane and the like. It is also possible to use tetrakis(4-hydroxyphenyl)alkane derivatives such as tetrakis(4-hydroxydimethylphenyl)methane and the like. Of these, useful are diglycidyl ether of bisphenol A, diglycidyl ether of bisphenol F, diglycidyl ether of bisphenol AF, diglycidyl ether of bisphenol AD, and diglycidyl ethers of higher-molecular-weight bisphenols A, F, AF and AD, because they have a low thermal shrinkage factor. Particularly preferable are diglycidyl ethers of higher-molecular-weight bisphenols A, F, AF and AD wherein the n of the repeating unit has a value of 2–18. The above polyfunctinal epoxy resins may be used in combination of two or more. If necessary, the polyfunctional epoxy resin may be mixed with a monofunctional epoxy resin such as butyl glycidyl ether, styrene oxide, phenyl glycidyl ether, allyl glycidyl ether or the like in order to obtain a lower viscosity. However, the amount of the monofunctional epoxy resin added should be small because, in general, the monofunctional epoxy resin has an effect for viscosity reduction but brings about increase in thermal shrinkage factor.

The acid anhydride used in the present invention has no particular restriction and can be any ordinary acid anhydride. Such an acid anhydride includes methylhexahydrophthalic anhydride, hexahydrophthalic anhydride, methyltetrahydrophthalic anhydride, tetrahydrophthalic anhydride, nadic anhydride, methylnadic anhydride, dodecylsuccinic anhydride, succinic anhydride, octadecylsuccinic anhydride, maleic anhydride, benzophenonetetracarboxylic anhydride, ethylene glycol bis(anhydrotrimellitate), glycerol tris(anhydrotrimellitate), etc. They can be used alone or in combination of two or more.

The maleimide used in the present invention can be any maleimide as long as it is an unsaturated imide containing in the molecule the group having the formula (I),

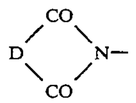

(I)

wherein D is a bivalent group containing a carbon-carbon double bond. Such an unsaturated imide includes, for example, bifunctional maleimides such as N,N'-ethylene-bismaleimide, N,N'-hexamethylene-bis-maleimide, N,N'-dodecamethylene-bismaleimide, N,N'-m-xylylene-bismaleimide, N,N'-p-xylylene-bismaleimide, N,N'-1,3-bismethylenecyclohexane-bismaleimide. N,N'-1,4-bismethylenecyclohexane-bismaleimide, N,N'-2,4-tolylene-bismaleimide, N,N'-2,6-tolylene-bismaleimide, N,N'-3,3'-diphenylmethane-bismaleimide, N,N'-(3-ethyl)-3,3'-diphenylmethane-bismaleimide, N,N'-(3,3'-dimethyl)-3,3'-diphenylmethane-bismaleimide, N,N'-(3,3'-diethyl)-3,3'-diphenylmethane-bismaleimide, N,N'-(3,3'-dichloro)-3,3'-diphenylmethane-bismaleimide, N,N'-4,4'-diphenylmethane-bismaleimide, N,N'-(3-ethyl)-4,4'-diphenylmethane-bismaleimide, N,N'-(3,3'-dimethyl )-4,4'-diphenylmethane-bismaleimide, N,N'-(3,3'-diethyl )-4,4'-diphenylmethane-bismaleimide, N,N'-(3,3'-dichloro)-4,4'-diphenylmethane-bismaleimide, N,N'-3,3'-diphenylsulfone-bismaleimide, N,N'-4,4'-diphenylsulfone-bismaleimide, N,N'-3,3'-diphenylsulfide-bismaleimide, N,N'-4,4'-diphenylsulfide-bismaleimide, N,N'-p-benzophenone-bismaleimide, N,N'-4,4'-diphenylethane-bismaleimide, N,N'-4,4'-diphenylether-bismaleimide, N,N'-(methyleneditetrahydrophenyl)bismaleimide, N,N'-tolidine-bismaleimide, N,N'-isophorone-bismaleimide, N,N'-p-diphenyldimethylsilyl-bismaleimide, N,N'-4,4'-diphenylpropane-bismaleimide, N,N'-naphthalene-bismaleimide, N,N'-p-phenylene-bismaleimide, N,N'-m-phenylene-bismaleimide, N,N'-4,4'-(1,1'-diphenylcyclohexane)bismaleimide, N,N'-3,5-(1,2,4-triazole)bismaleimide, N,N'-pyridine-2,6-diyl-bismaleimide, N,N'-5-methoxy-1,3-phenylene-bismaleimide, 1,2-bis(2-maleimideethoxy)ethane, 1,3-bis(3-maleimidepropoxy)propane, N,N'-4,4'-diphenylmethane-bisdimethylmaleimide, N,N'-hexamethylene-bisdimethylmaleimide, N,N'-4,4'-(diphenylether)bisdimethylmaleimide, N,N'-4,4'-(diphenylsulfone)bisdimethylmaleimide, N,N'-bismaleimide of 4,4'-diaminotriphenyl phosphate, N,N'-bismaleimide of 2,2'-bis[4-(4-aminophenoxy)phenyl]propane, N,N'-bismaleimide of 2,2'-bis[4-(4-aminophenoxy)phenylmethane, N,N'-bismaleimide of 2,2'-bis[4-(4-aminophenoxy)phenylethane and the like; polyfunctional maleimides obtained by reacting maleic anhydride with an aniline-formalin reaction product (a polyamine compound), 3,4,4'-triaminodiphenylmethane, triaminophenol or the like; monomaleimides such as phenylmaleimide, tolylmaleimide, xylylmaleimide and the like; various citraconimides; and various itaconimides. These unsaturated imides can be used by adding to an epoxy resin, or can be cured with a diallylphenol compound, an allylphenol compound or a diamine compound or with a catalyst alone.

The flexibilizer used in the present invention can be any flexibility-imparting agent as long as it can impart flexibility, toughness and adhesion. Such a flexibilizer includes, for example, diglycidyl ether of linoleic acid dimer, diglycidyl ether of polyethylene glycol, diglycidyl ether of polypropylene glycol, diglycinyl ether of alkylene oxide adduct of bisphenol A, urethane-modified epoxy resin, polybutadiene-modified epoxy resin, polyethylene glycol, polypropylene glycol, polyol (e.g. hydroxyl group-terminated polyester), polybutadiene, alkylene oxide adduct of bisphenol A, polythiol, urethane prepolymer, polycarboxyl compound, phenoxy resin and polycaprolactone. The flexibilizer may be a low viscosity compound such as caprolactone or the like, which is polymerized at the time of curing of the impregnant resin and thereby exhibits flexibility. Of the above flexibilizers, a polyol, a phenoxy resin or a polycaprolactone is preferable in view of the high toughness and low thermal expansion.

The catalyst used in the present invention has no particular restriction and can be any compound as long as it has an action of accelerating the reaction of an epoxy resin or a maleimide. Such a compound includes, for example, tertiary amines such as trimethylamine, triethylamine, tetramethylbutanediamine, triethylenediamine and the like; amines such as dimethylaminoethanol, dimethylaminopentanol, tris(dimethylaminomethyl)phenol, N-methylmorpholine and the like; quaternary ammonium salts such as cetyltrimethylammonium bromide, cetyltrimethylammonium chloride, cetyltrimethyl-ammonium iodide, dodecyltrimethylammonium bromide, dodecyltri-methylammonium chloride, dodecyltrimethylammonium iodide, benzyldimethyltetradecylammonium chloride, benzyldimethyltetradecylammonium bromide, allyldodecyltrimethylammonium bromide, benzyldimethylstearylammonium bromide, stearyltrimethylammonium chloride, benzyldimethyltetradecylammonium acetylate and the like; imidazoles such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cycanoethyl-2-phenylimidazole, 1-cyanoethyl-2-methylimidazole, 1-cyanoethyl-2-undecylimidazole, 1-azine-2-methylimidazole, 1-azine-2-undecylimidazole and the like; microcapsules of amines or imidazoles; metal salts between (a) an amine or imidazole and (b) zinc octanoate, cobalt or the like; 1,8-diaza-bicyclo[5.4.0]-undecene-7; N-methylpiperazine; tetramethylbutylguanidine; amine tetraphenyl borates such as triethylammonium tetraphenyl borate, 2-ethyl-4-methyltetraphenyl borate, 1,8-diazabicyclo[5.4.0]-undecene-7-tetraphenyl borate and the like; triphenylphosphine; triphenylphosphonium tetraphenyl borate; aluminum trialkylacetoacetates; aluminum trisacetylacetoacetate; aluminum alcoholates; aluminum acylates; sodium alcoholates; boron trifluoride; complexes between boron trifluoride and an amine or imidazole; diphenyliodonium salt of $HAsF_6$; aliphatic sulfonium salts; amineimides obtained by reacting an alkyl monocarboxylate with a hydrazine and a monoepoxy compound; and metal (e.g. cobalt, manganese, iron) salts of octylic acid or naphthenic acid. Of these, particularly useful are quaternary ammonium salts, metal salts between (a) an amine or imidazole and (b) zinc octanoate, cobalt or the like, amine tetraphenyl borates, complexes between boron trifluoride and an amine or imidazole, diphenyliodonium salt of $HAsF_6$, aliphatic sulfonium salts, amineimides, microcapsules of amines or imidazoles, etc. because they are relatively stable at room temperature but can cause a reaction easily at elevated temperatures, that is, they are latent curing catalysts. These curing agents are added ordinarily in an amount of 0.1–10% by weight based on the polyfunctional epoxy resin.

The stress which a superconducting magnet coil undergoes during operation of the superconducting magnet, includes a residual stress generated at the time of production, a thermal stress applied during cooling and an electromagnetic force applied during operation. First, description is made on the thermal stress applied to the cured resin of a superconducting magnet coil when the coil after production is cooled to a liquid helium temperature, i.e. 4.2K.

The thermal stress a applied to the cured resin of a superconducting magnet coil when the coil after production is cooled to a liquid helium temperature, i.e 4.2K, can be represented by the following formula:

$$\sigma = \int_{T}^{4.2\ K} (\alpha_R - \alpha_S) E\, dT$$

wherein $\alpha_R$ is a thermal expansion coefficient of the cured resin; $\alpha_S$ is a thermal expansion coefficient of the superconducting wire of the coil; E is a modulus of the cured resin; and T is a curing temperature of the resin used for obtaining the cured resin. Since the modulus at temperatures above the glass transition temperature Tg of the cured resin is smaller by about two figures than the modulus at the glass transition temperature Tg or below, the thermal stress applied to the cured resin of superconducting magnet coil when the coil after production is cooled to 4.2K, can be substantially represented by the following formula (1) holding for when the coil after production is cooled from the glass transition temperature of the cured resin to 4.2K:

$$\sigma = \int_{Tg}^{4.2\ K} (\alpha_R - \alpha_S) E\, dT \qquad (1)$$

Now, the thermal stress a applied to the cured resin of superconducting magnet coil when the coil after production is cured to 4.2K is roughly calculated from the above formula (1), using assumptions that the thermal shrinkage factor of the cured resin when cooled from the glass transition temperature Tg to 4.2K is 2.0%, the thermal shrinkage factor of the superconducting wire of coil when cooled under the same condition is 0.3% and the modulus of the cured resin be 1.000 $kg/mm^2$ at 4.2K; the rough calculation gives a thermal stress $\sigma$ of about 17 $kg/mm^2$. Meanwhile, cured epoxy resins ordinarily have a strength of 17–20 $kg/mm^2$ at 4.2K. Accordingly, when the superconducting magnet coil after production is cooled to a liquid helium temperature, i.e. 4.2K, the thermal stress $\sigma$ plus the residual stress generated at the time of coil production allow the cured resin to form microcracks of several microns; the releasing energy of the stress of the cured resin gives rise to a temperature increase of several degrees at the peripheries of the microcracks; as a result, the resistance of the superconducting wire is increased rapidly and there occurs a transition from a superconducting state to a state of normal conduction, i.e. a so-called quench phenomenon. In superconducting magnet coils used in linear motor cars, MRI, etc., further an electromagnetic force of at least about 4 $kg/mm^2$ is repeatedly applied during operation at 4.2K. This force plus the above-mentioned thermal stress and residual stress allow the cured resin to form cracks, and the releasing energy of the stress gives rise to a quench phenomenon.

The thermal stress a applied to the cured resin of superconducting magnet coil when the coil after production is cooled to 4.2K is roughly calculated from the formula (1), using a thermal shrinkage factor of the cured resin of 1.5% when cooled to 4.2K and a modulus of the cured resin of 1,000 $kg/mm^2$ at 4.2K; the rough calculation gives a thermal stress a of about 12 $kg/mm^2$. When an electromagnetic force of about 4 $kg/mm^2$ is repeatedly applied to the above thermal stress during operation at 4.2K, the total stress becomes about 16 $kg/mm^2$.

Meanwhile, cured epoxy resins ordinarily have a strength of 17–20 $kg/mm^2$ at 4.2K. Therefore, on calculation, this strength can withstand the thermal stress applied to the cured resin of superconducting magnet coil when cooled to 4.2K and the electromagnetic force repeatedly applied to the cured resin during operation.

Various impregnant resins of different thermal shrinkage factors for superconducting magnet coil were actually tested. The test indicated that when there is used, as an impregnant resin for superconducting magnet coil, a curable resin composition giving a cured product having a thermal shrinkage factor of 1.5–0.3% when cooled from the glass transition temperature to a liquid helium temperature, i.e. 4.2K, a bend-breaking strain of 2.9–3.9% at 4.2K and a modulus of 500–1,000 $kg/mm^2$ at 4.2K, the cured resin composition of superconducting magnet coil generates no crack when cooled to a liquid helium temperature, i.e. 4.2K. The test also indicated that no quench appears even in a superconducting operation at 4.2K wherein an electromagnetic force is further applied.

When there is used, in particular, a thermosetting resin composition giving a cured product having a thermal shrinkage factor of 1.0–0.3% when cooled from the glass transition temperature to a liquid helium temperature, i.e. 4.2K, a bend-breaking strain of 2.9–3.9% and a modulus of 500–1,000 $kg/mm^2$, quench can be prevented with a large allowance even in a superconducting operation at 4.2K in which an electromagnetic force is applied.

The present invention is hereinafter described more specifically by way of Examples. However, the present invention is by no means restricted to these Examples.

The determination of thermal shrinkage was carried out with a thermal-mechanical analyzer (TMA) having a sample-system provided in a cryostat which can cool a sample to a very low temperature and a measurement-system containing a differential transformer with which the change of dimension of the sample detected by a detecting rod can be measured.

The determination of bending properties was carried out by immersing a sample in liquid helium using a conventional bend test apparatus equipped with a cryostat which can cool the sample to a very low temperature. The size of the sample is 80 mm×9 mm×5 mm. The conditions of the determination were:

length between supports: 60 mm
head speed: 2 mm/min
three-point bending.

In the Examples, the abbreviations used for polyfunctional epoxy resins, flexibilizers, curing catalysts and bismaleimides refer to the followings.

DER-332: diglycidyl ether of bisphenol A (epoxy equivalent: 175)
EP-825: diglycidyl ether of bisphenol A (epoxy equivalent: 178)
EP-827: diglycidyl ether of bisphenol A (epoxy equivalent: 185)
EP-828: diglycidyl ether of bisphenol A (epoxy equivalent: 189)
EP-1001: diglycidyl ether of bisphenol A (epoxy equivalent: 472)
EP-1002: diglycidyl ether of bisphenol A (epoxy equivalent: 636)
EP-1003: diglycidyl ether of bisphenol A (epoxy equivalent: 745)
EP-1055: diglycidyl ether of bisphenol A (epoxy equivalent: 865)
EP-1004AF: diglycidyl ether of bisphenol A (epoxy equivalent: 975)
EP-1007: diglycidyl ether of bisphenol A (epoxy equivalent: 2006)
EP-1009: diglycidyl ether of bisphenol A (epoxy equivalent: 2473)
EP-1010: diglycidyl ether of bisphenol A (epoxy equivalent: 2785)
EP-807: diglycidyl ether of bisphenol F (epoxy equivalent: 170)
PY-302-2: diglycidyl ether of bisphenol AF (epoxy equivalent: 175)
DGEBAD: diglycidyl ether of bisphenol AD (epoxy equivalent: 173)
HP-4032: 2,7-diglycidyl ether naphthalene (epoxy equivalent: 150)
TGADPM: tetraglycidylaminodiphenylmethane
TTGmAP: tetraglycidyl-m-xylylenediamine
TGpAP: triglycidyl-p-aminophenol
TGmAP: triglycidyl-m-aminophenol
CEL-2021: 3,4-epoxycyclohexylmethyl-(3,4-epoxy)cyclohexane carboxylate (epoxy equivalent: 138)
LS-108: bis-2,2'-{4,4'-[2-(2,3-epoxy)propoxy-3-butoxypropoxy]phenyl}propane (epoxy equivalent: 2100)
LS-402: bis-2,2'-{4,4'-[2-(2,3-epoxy)propoxy-3-butoxypropoxy]phenyl}propane (epoxy equivalent: 4600)
HN-5500: methylhexahydrophthalic anhydride (acid anhydride equivalent: 168)
HN-2200: methyltetrahydrophthalic anhydride (acid anhydride equivalent: 166)
iPA-Na: sodium isopropylate
BTPP-K: tetraphenylborate of triphenylbutylphosphine
2E4MZ-K: tetraphenylborate of 2-ethyl-4-methylimidazole
2E4MZ-CN-K: tetraphenylborate of 1-cyanoethyl-2-ethyl-4-methylimidazole
TEA-K: tetraphenylborate of triethylamine
TPP-K: tetraphenylborate of triphenylphosphine
TPP: triphenylphosphine
IOZ: salt between 2-ethyl-4-methylimidazole and zinc octanoate
DY063: alkyl alkoholate
YPH-201: an amineimide obtained by reacting an alkyl monocarboxylate with a hydrazine and a monoepoxy compound (YPH-201 manufactured by Yuka Shell Epoxy K.K.)

CP-66: an aliphatic sulfonium salt of a protonic acid (ADEKA OPTON CP-66 manufactured by ASAHI DENKA KOGYO K.K.)
PX-4BT: tetrabutylphosphonium benzotriazolate
$BF_3$-400: boron trifluoride salt of piperazine
$BF_3$-100: boron trifluoride salt of triethylamine
2E4MZ-CNS: trimellitic acid salt of 2-ethyl-4-methylimidazole
2E4MZ-OK: isocyanuric acid salt of 2-ethyl-4-methylimidazole
MC-C11Z-AZINE: microcapsule of 1-azine-2-undecylimidazole
2E4MZ-CN: 1-cycnoethyl-2-ethyl-4-methylimidazole
BDMTDAC: benzyldimethyltetradecylammonium chloride
BDMTDAI: benzyldimethyltetradecylammonium iodide
HMBMI: N,N'-hexamethylene-bismaleimide
BMI: N,N'-4,4'-diphenylmethane-bismaleimide
DMBMI: N,N'-(3,3'-dimethyl)-4,4'-diphepylmethane-bismaleimide
DAPPBMI: N,N'-bismaleimide of 2,2'-bis[4-(4-aminophenoxy)phenyl]propane
PMI: N,N'-polymaleimide of a reaction product (a polyamine compound) between aniline and formalin
DABPA: diallylbisphenol A
PPG: polypropylene glycol
KR: ϵ-caprolactone
DGEAOBA: diglycidyl ether of an alkylene oxide adduct of bisphenol A
PPO: phenoxy resin
CTBN: acrylonitrile-modified carboxyl group-terminated polybutadiene rubber
2PZCN: 1-cyanoethyl-2-phenylimidazole
LBO: lithium butoxide
PZ: pyridine
TEA: triethylamine
M2-100: benzylconium chloride
N-MM: N-methylmorpholine
MDI: 4,4'-diphenylmethane diisocyanate, equivalent: 125
LMDI: a mixture of MDI, an MDI derivative whose isocyanate group has been converted to carbodiimide and an MDI derivative whose isocyanate groups have been converted to carbodiimide, which mixture is liquid at room temperature, equivalent: about 140
TDI: a mixture of 80% of 2,4-tolylene diisocyanate and 20% of 2,6-tolylene diisocyanate, equivalent: 87
KR2019: a resin obtained by condensation polymerization of methylphenylsilicone

EXAMPLES 1-65 AND COMPARATIVE EXAMPLES 1-6

Each of the resin compositions shown in Tables 1-1 to 1-13 was thoroughly stirred, placed in a mold, and heat-cured under the curing conditions shown in Tables 1-1 to 1-13. Each of the resulting cured products was measured for thermal shrinkage factor when cooled from the glass transition temperature to 4.2K, and the results are shown in Tables 1-1 to 1-13. Each cured product was also measured for bending properties at 4.2K, and the bending strain and bending modulus are shown in Tables 1-1 to 1-13. All of the curable resin compositions of Examples 1–65 according to the present invention, when cured, had a thermal strinkage factor of 1.5–0.3% when cooled from the glass transition temperature to 4.2K, a bend-breaking strain of 2.9–3.9% at 4.2K and a modulus of 500–1,000 kg/mm$^2$ at 4.2K.

EXAMPLE 66 AND COMPARATIVE EXAMPLE 7

Figure 2:
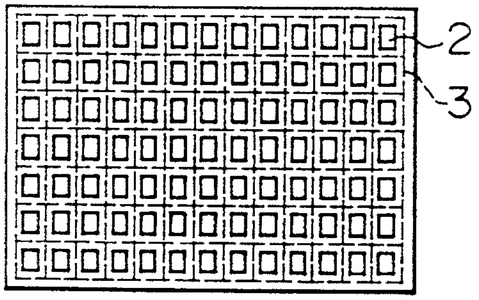
FIG. 2 is a cross-sectional view of the coil of FIG. 1 when cut at II—II′ line.
Figure 3:
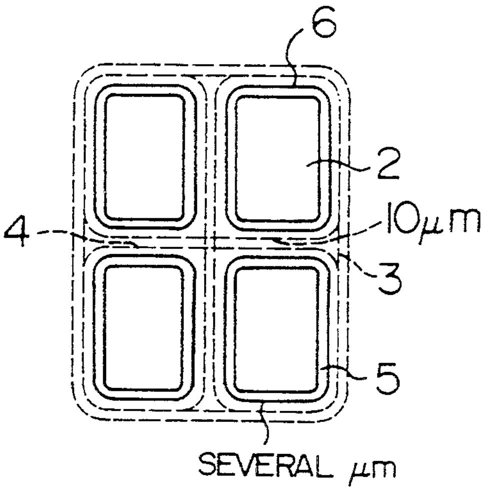
FIG. 3 is a fragmentary enlarged view of FIG. 2 of a conventional race track-shaped superconducting magnet coil.

Superconducting wires were wound to form coils of the same material and the same shape. The coils were impregnated with the curable resin compositions of Examples 1–65 and Comparative Examples 1–6, and the impregnated coils were heat-cured under given curing conditions to prepare small race track-shaped superconducting magnet coils. Switches for permanent current were also prepared by impregnation with each of the curable resin compositions of Examples 1–65 and Comparative Examples 1–6 and subsequent heat-curing under given curing conditions. FIG. 1 is a perspective view showing the superconducting magnet coils thus prepared. FIG. 2 is a cross-sectional view of the coil of FIG. 1 when cut at an II—II' line. In any of the coils, a cured product 3 of an curable resin composition was filled between the conductors 2 and any unfilled portion (e.g. void) was not observed. These coils were cooled to 4.2K. As shown in FIG. 3, in each of the coils impregnated with each of the curable resin compositions of Comparative Examples 1–6, cracks were generated in the cured resin composition 3; the cracks reached even the enamel insulating layer 5 of each conductor 2, which caused even the peeling 6 of the enamel insulating layer 5. Meanwhile, in the coils impregnated with each of the curable resin compositions of Examples 1–65, neither cracking of the cured resin composition nor peeling of the enamel insulating layer was observed.

EXAMPLE 67 AND COMPARATIVE EXAMPLE 8

Figure 4:
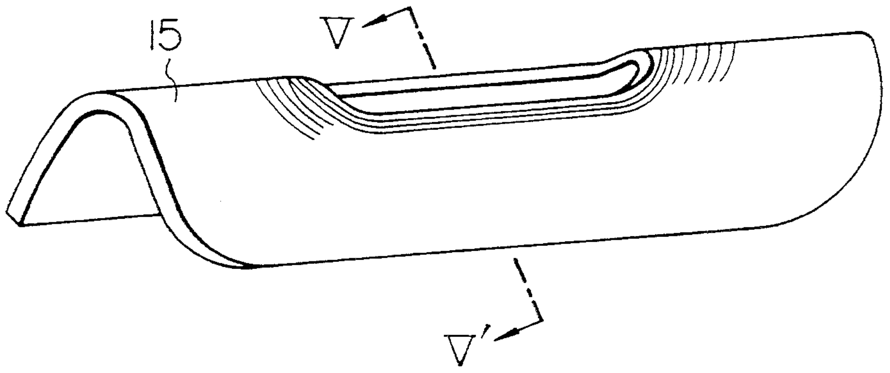
FIG. 4 is a perspective view of a saddle-shaped superconducting magnet coil.
Figure 5:
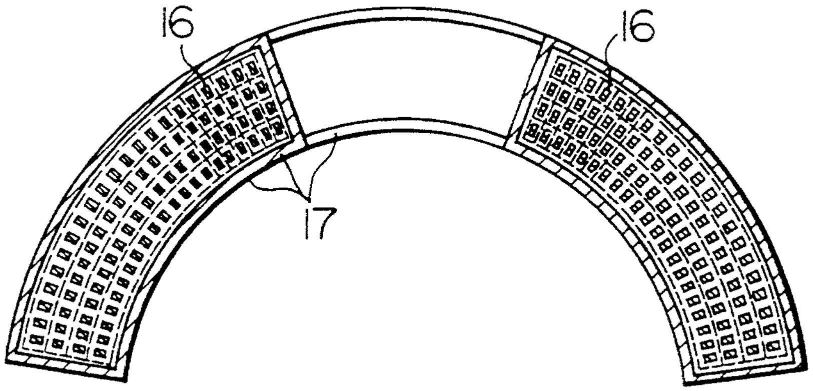
FIG. 5 is a cross-sectional view of the coil of FIG. 4 when cut at a V—V′ line.

Superconducting wires were wound to form coils of the same material and the same shape. The coils were impregnated with each of the curable resin compositions of examples 1–65 and Comparative Examples 1–6, and the impregnated coils were heat-cured under given curing conditions to prepare saddle-shaped superconducting magnet coils. FIG. 4 is a perpspective view showing the superconducting magnet coils thus prepared. FIG. 5 is a cross-sectional view of the coil of FIG. 4 when cut at V—V' line. These saddle-shaped superconducting magnet coils were .cooled to 4.2K. In the coils impregnated with each of the curable resin compositions of Comparative Examples 1–6, cracks were generated in the cured resin composition. Meanwhile, in the coils impregnated with each of the curable resin compositions of Examples 1–65, no crack was observed.

TABLE 1

Thermal shrinkage factors of thermosetting resins

[Effect of repeating unit (molecular weight between crosslinked sites)]

| | Resin composition | | Thermal shrinkage factor (%) | Bending strain (% at 4.2 K) | Bending modulus (Kg/mm$^2$ at 4.2 K) | Remarks |
|---|---|---|---|---|---|---|
| Comparative | DER332<br>HN-5500 | 100<br>92 | 1.73 | 2.3 | 650 | n = 0.02<br>Bisphenol |

TABLE 1-continued

Thermal shrinkage factors of thermosetting resins

| | | | | | | |
|---|---|---|---|---|---|---|
| Example 1 | PPG | 15 | | | | A type |
| | 2E4MZ-CN | 0.9 | | | | |
| Compara- | EP-825 | 100 | 1.68 | 2.7 | 670 | n = 0.06 |
| tive | HN-5500 | 90 | | | | Bisphenol |
| Example 2 | PPG | 15 | | | | A type |
| | 2E4MZ-CN | 0.95 | | | | |
| Compara- | EP-828 | 100 | 1.65 | 2.9 | 690 | n = 0.13 |
| tive | HN-5500 | 85 | | | | Bisphenol |
| Example 3 | PPG | 15 | | | | A type |
| | 2E4MZ-CN | 0.93 | | | | |
| Example 1 | EP-1001 | 100 | 1.23 | 3.0 | 720 | n = 2.13 |
| | HN-5500 | 34 | | | | Bisphenol |
| | PPG | 15 | | | | A type |
| | 2E4MZ-CN | 0.33 | | | | |
| Example 2 | EP-1002 | 100 | 1.19 | 3.0 | 730 | n = 3.28 |
| | HN-5500 | 25 | | | | Bisphenol |
| | PPG | 15 | | | | A type |
| | 2E4MZ-CN | 0.25 | | | | |
| Example 3 | EP-1003 | 100 | 1.16 | 3.1 | 730 | n = 4.05 |
| | HN-5500 | 22 | | | | Bisphenol |
| | PPG | 15 | | | | A type |
| | 2E4MZ-CN | 0.21 | | | | |
| Example 4 | EP-1055 | 100 | 0.92 | 3.2 | 740 | n = 4.89 |
| | HN-5500 | 19 | | | | Bisphenol |
| | PPG | 15 | | | | A type |
| | 2E4MZ-CN | 0.18 | | | | |
| Example 5 | EP-1004AF | 100 | 0.88 | 3.3 | 740 | n = 5.67 |
| | HN-5500 | 17 | | | | Bisphenol |
| | PPG | 15 | | | | A type |
| | iPA-Na | 0.16 | | | | |
| Example 6 | EP-1007 | 100 | 0.75 | 3.3 | 740 | n = 12.93 |
| | HN-5500 | 8 | | | | Bisphenol |
| | PPG | 15 | | | | A type |
| | iPA-Na | 0.2 | | | | |
| Example 7 | EP-1002 | 100 | 0.55 | 3.5 | 720 | n = 16.21 |
| | HN-5500 | 7 | | | | Bisphenol |
| | PPG | 15 | | | | A type |
| | iPA-Na | 0.2 | | | | |
| Example 8 | EP-1010 | 100 | 0.35 | 3.5 | 720 | n = 18.42 |
| | HN-5500 | 6 | | | | Bisphenol |
| | PPG | 15 | | | | A type |
| | iPA-Na | 0.2 | | | | |
| Example 9 | DER-332 | 50 | 1.15 | 3.0 | 705 | n = 0.02 |
| | EP-1003 | 213 | | | | n = 4.05 |
| | HN-5500 | 85 | | | | Bisphenol |
| | PPG | 15 | | | | A type |
| | 2E4MZ-CN | 0.1 | | | | |
| Example 10 | DER-332 | 50 | 1.10 | 3.1 | 710 | n = 0.02 |
| | EP-1055 | 301 | | | | n = 4.89 |
| | HN-5500 | 85 | | | | Bisphenol |
| | PPG | 15 | | | | A type |
| | 2E4MZ-CN | 0.1 | | | | |
| Example 11 | DER-332 | 50 | 1.00 | 3.1 | 710 | n = 0.02 |
| | EP-1004AF | 279 | | | | n = 5.67 |
| | HN-5500 | 85 | | | | Bisphenol |
| | PPG | 5 | | | | A type |
| | 2E4MZ-CN | 0.1 | | | | |
| Example 12 | DER-332 | 50 | 0.95 | 3.1 | 710 | n = 0.02 |
| | EP-1009 | 707 | | | | n = 16.21 |
| | HN-5500 | 85 | | | | Bisphenol |
| | PPG | 15 | | | | A type |
| | 2E4MZ-CN | 0.1 | | | | |
| Example 13 | DER-332 | 50 | 0.90 | 3.2 | 710 | n = 0.02 |
| | EP-1010 | 757 | | | | p = 18.42 |
| | HN-5500 | 85 | | | | Bisphenol |
| | PPG | 15 | | | | A type |
| | 2E4MZ-CN | 0.1 | | | | |
| Example 14 | XB-4122 | 100 | 1.39 | 2.9 | 720 | n = 0.2 |
| | HN-5500 | 46 | | | | |
| | 2E4MZ-CN | 0.1 | | | | |
| Example 15 | LS-108 | 100 | 1.35 | 2.9 | 720 | n = 5 |
| | HN-5500 | 8 | | | | |
| | 2E4MZ-CN | 0.1 | | | | |
| Example 16 | LS-402 | 100 | 1.15 | 2.9 | 720 | n = 10 |
| | HN-5500 | 4 | | | | |
| | 2E4MZ-CN | 0.1 | | | | |
| Example 17 | PY-302-2 | 95 | 1.23 | 3.0 | 690 | |
| | EP-1007 | 50 | | | | |
| | HN-5500 | 92 | | | | |
| | PPG | 15 | | | | |
| | iPA-Na | 0.2 | | | | |

TABLE 1-continued

Thermal shrinkage factors of thermosetting resins

| | | | | | | |
|---|---|---|---|---|---|---|
| Example 18 | DGEBAD | 94 | 1.28 | 2.9 | 670 | |
| | EP-1007 | 50 | | | | |
| | HN-5500 | 92 | | | | |
| | PPG | 15 | | | | |
| | iPA-Na | 0.2 | | | | |
| Example 19 | TGADPM | 80 | 1.25 | 2.9 | 690 | |
| | EP-1075 | 50 | | | | |
| | HN-5500 | 92 | | | | |
| | PPG | 15 | | | | |
| | iPA-Na | 0.2 | | | | |
| Example 20 | TTGmAP | 80 | 1.23 | 3.0 | 700 | |
| | EP-1007 | 50 | | | | |
| | HN-5500 | 92 | | | | |
| | PPG | 15 | | | | |
| | iPA-Na | 0.2 | | | | |
| Example 21 | TGpAP | 80 | 1.15 | 3.0 | 700 | |
| | EP-1007 | 50 | | | | |
| | HN-5500 | 92 | | | | |
| | PPG | 15 | | | | |
| | iPA-Na | 0.2 | | | | |
| Example 22 | TGmAP | 80 | 1.20 | 2.9 | 730 | |
| | EP-1007 | 50 | | | | |
| | HN-5500 | 92 | | | | |
| | PPG | 15 | | | | |
| | iPA-Na | 0.2 | | | | |
| Example 23 | CEL-2021 | 76 | 1.20 | 3.2 | 740 | |
| | EP-1055 | 50 | | | | |
| | HN-5500 | 92 | | | | |
| | PPG | 15 | | | | |
| | iPA-Na | 0.2 | | | | |
| Example 24 | CEL-2021 | 76 | 1.10 | 3.3 | 740 | |
| | EP-1004AF | 100 | | | | |
| | HN-2200 | 91 | | | | |
| | PPG | 15 | | | | |
| | iPA-Na | 0.16 | | | | |
| Example 25 | EP-807 | 100 | 1.28 | 3.0 | 735 | |
| | PPG | 10 | | | | |
| | $BF_3$-400 | 10 | | | | |
| Example 26 | EP-807 | 100 | 1.18 | 3.2 | 720 | |
| | PPG | 15 | | | | |
| | $BF_3$-400 | 10 | | | | |
| Example 27 | EP-807 | 100 | 1.09 | 3.2 | 720 | |
| | PPG | 20 | | | | |
| | $BF_3$-400 | 10 | | | | |
| Example 28 | EP-807 | 100 | 1.28 | 3.1 | 725 | |
| | PPG | 10 | | | | |
| | $BF_3$-100 | 10 | | | | |
| Example 29 | EP-807 | 100 | 1.25 | 2.9 | 740 | |
| | PPG | 10 | | | | |
| | CP-66 | 3 | | | | |
| Example 30 | EP-807 | 100 | 1.20 | 3.1 | 732 | |
| | PPG | 10 | | | | |
| | PX-4BT | 5 | | | | |
| Example 31 | EP-807 | 100 | 1.10 | 3.3 | 720 | |
| | PPG | 10 | | | | |
| | YPH-201 | 5 | | | | |

Chemical structure of epoxy resin
Curing conditions 100° C./15h + 120° C./15h

| | Resin composition | | Thermal shrinkage factor (%) | Bending strain (% at 4.2 K) | Bending modulus ($Kg/mm^2$ at 4.2 K) | Remarks |
|---|---|---|---|---|---|---|
| Example 32 | EP-807 | 100 | 1.15 | 3.1 | 705 | |
| | PPG | 10 | | | | |
| | IOZ | 5 | | | | |
| Example 33 | EP-807 | 100 | 1.10 | 3.2 | 700 | |
| | PPG | 15 | | | | |
| | TPP | 5 | | | | |
| Example 34 | EP-807 | 100 | 1.05 | 3.2 | 720 | |
| | PPG | 20 | | | | |
| | TPP-K | 8 | | | | |
| Example 35 | EP-807 | 100 | 1.20 | 3.1 | 700 | |
| | PPG | 10 | | | | |
| | TEA-K | 8 | | | | |
| Example 36 | EP-807 | 100 | 1.20 | 3.1 | 698 | |
| | PPG | 10 | | | | |
| | 2ED4MZ-K | 5 | | | | |
| Example 37 | EP-807 | 100 | 1.15 | 3.2 | 700 | |
| | PPG | 10 | | | | |
| | BTPP-K | 5 | | | | |
| Example 38 | EP-807 | 100 | 1.10 | 3.2 | 700 | |

TABLE 1-continued

| Thermal shrinkage factors of thermosetting resins | | | | | | |
|---|---|---|---|---|---|---|
| | PPG | 10 | | | | |
| | iPA-Na | 1.0 | | | | |

Curing conditions 90° C./15h + 120° C./15h

| | Resin composition | | Thermal shrinkage factor (%) | Bending strain (% at 4.2 K) | Bending modulus ($Kg/mm^2$ at 4.2 K) | Remarks |
|---|---|---|---|---|---|---|
| Example 39 | EP-807 | 100 | 1.20 | 2.9 | 710 | |
| | PPG | 10 | | | | |
| | 2E4MZ-CN-K | 5 | | | | |
| Example 40 | EP-807 | 100 | 1.20 | 3.0 | 720 | |
| | PPG | 15 | | | | |
| | 2E4MZ-CNS | 5 | | | | |
| Example 41 | EP-807 | 100 | 1.05 | 3.2 | 720 | |
| | PPG | 20 | | | | |
| | 2E4MZ-OK | 8 | | | | |
| Example 42 | EP-807 | 100 | 1.20 | 2.9 | 720 | |
| | PPG | 10 | | | | |
| | 2E4MZ-CN | 2 | | | | |
| Example 43 | EP-807 | 100 | 1.20 | 2.9 | 720 | |
| | PPG | 10 | | | | |
| | MC-C11Z-AZINE | 5 | | | | |
| Example 44 | EP-807 | 100 | 1.95 | 3.2 | 700 | |
| | PPG | 10 | | | | |
| | BDMTDAC | 10 | | | | |
| Example 45 | EP-807 | 100 | 0.96 | 3.2 | 700 | |
| | PPG | 10 | | | | |
| | BDMTDAI | 10 | | | | |

Curing conditions 90° C./15h + 120° C./15h

| | Resin composition | | Thermal shrinkage factor (%) | Bending strain (% at 4.2 K) | Bending modulus ($Kg/mm^2$ at 4.2 K) | Remarks |
|---|---|---|---|---|---|---|
| Example 44 | PY-302-2 | 100 | 1.20 | 3.2 | 735 | |
| | PPG | 10 | | | | |
| | $BF_3$-400 | 10 | | | | |
| Example 45 | PY-302-2 | 100 | 1.16 | 3.3 | 720 | |
| | PPG | 15 | | | | |
| | $BF_3$-400 | 10 | | | | |
| Example 46 | PY-302-2 | 100 | 1.09 | 3.3 | 715 | |
| | PPG | 20 | | | | |
| | $BF_3$-400 | 10 | | | | |
| Example 47 | EP-807 | 100 | 1.00 | 3.3 | 710 | |
| | PPO | 10 | | | | |
| | $BF_3$-400 | 10 | | | | |
| Example 48 | EP-807 | 100 | 1.15 | 3.1 | 720 | |
| | DGEAOBA | 10 | | | | |
| | $BF_3$-400 | 10 | | | | |
| Example 49 | EP-807 | 100 | 1.20 | 3.1 | 732 | |
| | KR | 10 | | | | |
| | $BF_3$-400 | 10 | | | | |
| Example 50 | EP-807 | 100 | 1.30 | 2.9 | 750 | |
| | CTBN | 10 | | | | |
| | $BF_3$-400 | 10 | | | | |
| Example 52 | EP-807 | 100 | 0.85 | 3.3 | 715 | |
| | DABPA | 20 | | | | |
| | DBMTDAC | 5 | | | | |
| Example 53 | EP-807 | 100 | 0.90 | 3. 4 | 710 | |
| | DABPA | 15 | | | | |
| | BDMTDAI | 5 | | | | |
| Example 54 | BMI | 50 | 0.80 | 3.2 | 720 | |
| | DABPA | 50 | | | | |
| | KR | 10 | | | | |
| | TPP-K | 8 | | | | |
| Example 55 | BMI | 50 | 0.75 | 3.1 | 730 | |
| | DABPA | 50 | | | | |
| | PPG | 10 | | | | |
| | TEA-K | 8 | | | | |
| Example 56 | DAPPBMI | 100 | 0.75 | 3.1 | 710 | |
| | DABPA | 50 | | | | |
| | PPG | 10 | | | | |
| | TEA-K | 5 | | | | |
| Example 57 | DAPPBMI | 100 | 1.70 | 2.9 | 745 | |
| | DABPA | 20 | | | | |
| | PPG | 10 | | | | |
| | TEA-K | 5 | | | | |

Curing conditons 90° C./15h + 120° C./15h

| | Resin composition | | Thermal shrinkage factor (%) | Bending strain (% at 4.2 K) | Bending modulus ($Kg/mm^2$ at 4.2 K) | Remarks |
|---|---|---|---|---|---|---|

TABLE 1-continued

Thermal shrinkage factors of thermosetting resins

| | | | | | | |
|---|---|---|---|---|---|---|
| Example 58 | DAPPBMI | 100 | 0.90 | 3.2 | 730 | |
| | DABPA | 5 | | | | |
| | PPG | 10 | | | | |
| | BDMTDAC | 5 | | | | |
| Example 59 | DAPPBMI | 100 | 1.0 | 2.9 | 750 | |
| | DABPA | 0 | | | | |
| | DR | 10 | | | | |
| | 2E4MZ-OK | 5 | | | | |
| Example 60 | DMBMI | 100 | 0.90 | 3.1 | 730 | |
| | DABPA | 50 | | | | |
| | KR | 15 | | | | |
| | 2E4MZ-OK | 5 | | | | |
| Example 61 | PMI | 100 | 0.90 | 3.1 | 720 | |
| | DABPA | 50 | | | | |
| | KR | 20 | | | | |
| | 2E4MZ-OK | 5 | | | | |
| Example 62 | HMBMI | 100 | 0.82 | 3.2 | 720 | |
| | DABPA | 50 | | | | |
| | KR | 20 | | | | |
| | 2E4MZ-OK | 5 | | | | |
| Example 63 | DAPPBMI | 100 | 1.20 | 2.9 | 730 | |
| | HMBMI | 100 | | | | |
| | 2E4MZ-OK | 5 | | | | |

Curing conditions 100° C./15h + 180° C./15h

| | Resin composition | | Thermal shrinkage factor (%) | Bending strain (% at 4.2 K) | Bending modulus (Kg/mm$^2$ at 4.2 K) | Remarks |
|---|---|---|---|---|---|---|
| Compara tive Example 4 | EP-1002 | 100 | 1.23 | 2.3 | 720 | |
| | HN-5500 | 25 | | | | |
| | PPG | 0 | | | | |
| | 2E4MZ-CN | 0.25 | | | | |
| Compara-tifve Example 5 | EP-1007 | 100 | 1.98 | 2.4 | 770 | |
| | HN-5500 | 8 | | | | |
| | PPG | 0 | | | | |
| | iPA-Na | 0.2 | | | | |
| Compara-tive Example 6 | EP-807 | 100 | 1.20 | 2.2 | 790 | |
| | PPG | 5 | | | | |
| | iPA-Na | 1.0 | | | | |
| Example 64 | DER-332 | 100 | 1.00 | 3.2 | 740 | |
| | HN-5500 | 92 | | | | |
| | PPG | 15 | | | | |
| | DAPPBMI | 50 | | | | |
| | 2E4MZ-CN | 0.33 | | | | |
| Example 65 | DER-332 | 100 | 0.98 | 3.2 | 760 | |
| | HN-5500 | 92 | | | | |
| | DAPPBMI | 50 | | | | |
| | DABPA | 20 | | | | |
| | PPG | 15 | | | | |
| | 2E4MZ-CN | 0.5 | | | | |

Curing conditions 100° C./15h + 120° C./15h

EXAMPLES 68–115

Each of the resin composition shown in Tables 2-1 to 2-11 was thoroughly stirred, placed in a mold, and heat-cured under the curing conditions shown in Tables 2-1 to 2-11. Each of the resulting cured products was measured for thermal shrinkage factor when cooled from the glass transition temperature to 4.2K, and the results are shown in Tables 2-1 to 2-11. Each cured product was also measured for bending properties at 4.2K, and the bending strain and bending modulus are shown in Tables 2-1 to 2-11. All of the curable resin compositions of Examples 68–115 according to the present invention, when cured, had a thermal shrinkage factor of 1.5–0.3% when cooled from the glass transition temperature to 4.2K, a bend-breaking strain of 3.5–4.5% at 4.2K and a modulus of 500–1,000 kg/mm$^2$ at 4.2K.

TABLE 2

Thermal shrinkage factors of thermosetting resins

| | Resin composition | | Thermal shrinkage factor (%) | Bending strain (% at 4.2 K) | Bending modulus (Kg/mm$^2$ at 4.2 K) | Remarks |
|---|---|---|---|---|---|---|
| Example 68 | DER332 | 100 | 1.49 | 3.5 | 650 | n = 0.02 |
| | HN-5500 | 92 | | | | Bisphenol |
| | PPG | 10 | | | | A type |
| | 2E4MZ-CN | 0.9 | | | | |
| Example 69 | EP-825 | 100 | 1.45 | 3.6 | 670 | n = 0.06 |
| | HN-5500 | 90 | | | | Bisphenol |
| | PPG | 10 | | | | A type |
| | 2E4MZ-CN | 0.95 | | | | |
| Example 70 | EP-828 | 100 | 1.46 | 3.6 | 690 | n = 0.13 |
| | HN-5500 | 85 | | | | Bisphenol |

TABLE 2-continued

Thermal shrinkage factors of thermosetting resins

| | | | | | | |
|---|---|---|---|---|---|---|
| | PPG | 10 | | | | A type |
| | 2E4MZ-CN | 0.93 | | | | |
| Example 71 | EP-1001 | 100 | 1.48 | 3.6 | 720 | n = 2.13 |
| | HN-5500 | 34 | | | | Bisphenol |
| | PPG | 10 | | | | A type |
| | 2E4MZ-CN | 0.33 | | | | |
| Example 72 | EP-1002 | 100 | 1.19 | 3.7 | 730 | n = 3.28 |
| | HN-5500 | 25 | | | | Bisphenol |
| | PPG | 10 | | | | A type |
| | 2E4MZ-CN | 0.25 | | | | |
| Example 73 | EP-1003 | 100 | 1.16 | 3.7 | 730 | n = 4.05 |
| | HN-5500 | 22 | | | | Bisphenol |
| | PPG | 10 | | | | A type |
| | 2E4MZ-CN | 0.21 | | | | |
| Example 74 | EP-1055 | 100 | 0.92 | 3.8 | 740 | n = 4.89 |
| | HN-5500 | 19 | | | | Bisphenol |
| | PPG | 10 | | | | A type |
| | 2E4MZ-CN | 0.18 | | | | |
| Example 75 | EP-1004AF | 100 | 0.88 | 3.7 | 740 | n = 5.67 |
| | HN-5500 | 17 | | | | Bisphenol |
| | PPG | 10 | | | | A type |
| | iPA-Na | 0.16 | | | | |
| Example 76 | EP-1007 | 100 | 0.75 | 3.6 | 740 | n = 12.93 |
| | HN-5500 | 8 | | | | Bisphenol |
| | PPG | 10 | | | | A type |
| | iPA-Na | 0.2 | | | | |
| Example 77 | EP-1009 | 100 | 0.55 | 3.6 | 720 | n = 16.21 |
| | HN-5500 | 7 | | | | Bisphenol |
| | PPG | 10 | | | | A type |
| | iPA-Na | 0.2 | | | | |
| Example 78 | EP-1010 | 100 | 0.55 | 3.6 | 720 | n = 18.42 |
| | HN-5500 | 6 | | | | Bisphenol |
| | PPG | 10 | | | | A type |
| | iPA-Na | 0.2 | | | | |
| Example 79 | DER-332 | 50 | 1.15 | 3.6 | 705 | n = 0.02 |
| | EP-1003 | 213 | | | | n = 4.05 |
| | HN-5500 | 85 | | | | Bisphenol |
| | PPG | 15 | | | | A type |
| | 2E4MZ-CN | 0.1 | | | | |
| Example 80 | DER-332 | 50 | 1.10 | 3.6 | 710 | n = 0.02 |
| | EP-1055 | 301 | | | | n = 4.89 |
| | HN-5500 | 85 | | | | Bisphenol |
| | PPG | 10 | | | | A type |
| | 2E4MZ-CN | 0.1 | | | | |
| Example 81 | DER-332 | 50 | 1.00 | 3.7 | 710 | n = 0.02 |
| | EP-1004AF | 279 | | | | n = 5.67 |
| | HN-5500 | 85 | | | | Bisphenol |
| | PPG | 10 | | | | A type |
| | 2E4MZ-CN | 0.1 | | | | |
| Example 82 | DER-332 | 50 | 0.95 | 3.7 | 710 | n = 0.02 |
| | EP-1009 | 707 | | | | n = 16.21 |
| | HN-5500 | 85 | | | | Bisphenol |
| | PPG | 10 | | | | A type |
| | 2E4MZ-CN | 0.1 | | | | |
| Example 83 | DER-332 | 50 | 0.90 | 3.6 | 710 | n = 0.02 |
| | EP-1010 | 757 | | | | p = 18.42 |
| | HN-5500 | 85 | | | | Bisphenol |
| | PPG | 10 | | | | A type |
| | 2E4MZ-CN | 0.1 | | | | |
| Example 84 | LS-108 | 100 | 1.35 | 3.7 | 720 | n = 5 |
| | HN-5500 | 8 | | | | |
| | 2E4MZ-CN | 0.1 | | | | |
| | PPG | 10 | | | | |
| Example 85 | LS-402 | 100 | 1.15 | 3.9 | 720 | n = 10 |
| | HN-5500 | 4 | | | | |
| | 2E4MZ-CN | 0.1 | | | | |
| | PPG | 10 | | | | |
| Example 86 | PY-302-2 | 95 | 1.23 | 3.6 | 690 | |
| | EP-1007 | 50 | | | | |
| | HN-5500 | 92 | | | | |
| | PPG | 10 | | | | |
| | iPA-Na | 0.2 | | | | |
| Example 87 | DGEBAD | 94 | 1.28 | 3.9 | 670 | |
| | EP-1007 | 50 | | | | |
| | HN-5500 | 92 | | | | |
| | PPG | 10 | | | | |
| | iPA Na | 0.2 | | | | |
| Example 88 | TGADPM | 80 | 1.25 | 3.8 | 690 | |
| | EP-1007 | 50 | | | | |
| | HN-5500 | 92 | | | | |
| | PPG | 10 | | | | |

TABLE 2-continued

| Thermal shrinkage factors of thermosetting resins | | | | | | |
|---|---|---|---|---|---|---|
| | iPA-Na | 0.2 | | | | |
| Example 89 | TTGmAP | 80 | 1.23 | 3.9 | 700 | |
| | EP-1007 | 50 | | | | |
| | HN-5500 | 92 | | | | |
| | PPG | 10 | | | | |
| | iPA-Na | 0.2 | | | | |
| Example 90 | TGpAP | 80 | 1.15 | 3.6 | 700 | |
| | EP-1007 | 50 | | | | |
| | HN-5500 | 92 | | | | |
| | PPG | 10 | | | | |
| | iPA-Na | 0.2 | | | | |
| Example 91 | TGmAP | 80 | 1.20 | 3.8 | 730 | |
| | EP-1007 | 50 | | | | |
| | HN-5500 | 92 | | | | |
| | PPG | 10 | | | | |
| | iPA Na | 0.2 | | | | |
| Example 92 | CEL-2021 | 76 | 1.20 | 3.9 | 740 | |
| | EP-1055 | 50 | | | | |
| | HN-5500 | 92 | | | | |
| | PPG | 15 | | | | |
| | iPA-Na | 0.2 | | | | |
| Example 93 | CEL-2021 | 76 | 1.10 | 3.8 | 740 | |
| | EP-1004AF | 100 | | | | |
| | HN-2200 | 91 | | | | |
| | PPG | 15 | | | | |
| | iPA-Na | 0.16 | | | | |
| Example 94 | PY302.2 | 100 | 1.40 | 3.8 | 650 | n = 0.02 |
| | HN-5500 | 94 | | | | Bisphenol |
| | PPG | 10 | | | | A type |
| | 2E4MZ-CN | 0.9 | | | | |
| Example 95 | PY302.2 | 100 | 1.48 | 3.6 | 670 | n = 0.06 |
| | HN-5500 | 94 | | | | Bisphenol |
| | PPG | 10 | | | | A type |
| | DY063 | 0.1 | | | | |
| Example 96 | PY302.2 | 100 | 1.35 | 3.6 | 690 | n = 0.13 |
| | HN-5500 | 94 | | | | Bisphenol |
| | PPG | 15 | | | | A type |
| | DY063 | 0.1 | | | | |
| Example 97 | DER-332 | 100 | 1.48 | 3.6 | 720 | n = 2.13 |
| | HN-5500 | 94 | | | | Bisphenol |
| | PPG | 10 | | | | A type |
| | DY063 | 0.1 | | | | |
| Example 98 | DER-332 | 100 | 1.31 | 3.6 | 720 | n = 2.13 |
| | HN-5500 | 94 | | | | Bisphenol |
| | PPG | 15 | | | | A type |
| | DY063 | 0.1 | | | | |
| Example 99 | HP4032 | 100 | 1.50 | 3.8 | 650 | n = 0.02 |
| | HN-5500 | 112 | | | | Bisphenol |
| | PPG | 10 | | | | A type |
| | 2E4MZ-CN | 0.9 | | | | |
| Example 100 | HP4032 | 100 | 1.45 | 3.6 | 670 | n = 0.06 |
| | HN-5500 | 112 | | | | Bisphenol |
| | PPG | 10 | | | | A type |
| | DY063 | 0.1 | | | | |
| Example 101 | HP4032 | 100 | 1.41 | 3.6 | 690 | n = 0.13 |
| | HN-5500 | 112 | | | | Bisphenol |
| | PPG | 15 | | | | A type |
| | DY063 | 0.1 | | | | |
| Example 102 | DER-332 | 100 | 1.38 | 3.6 | 720 | n = 2.13 |
| | HN-5500 | 94 | | | | Bisphenol |
| | PPG | 10 | | | | A type |
| | TPP | 0.1 | | | | |
| Example 103 | DER-332 | 100 | 1.28 | 3.6 | 720 | n = 2.13 |
| | HN-5500 | 94 | | | | Bisphenol |
| | PPG | 10 | | | | A type |
| | BTPP-K | 0.1 | | | | |
| Example 104 | DER-332 | 100 | 1.38 | 3.8 | 650 | n = 0.02 |
| | HN-5500 | 94 | | | | Bisphenol |
| | CTBN | 10 | | | | A type |
| | 2E4MZ-CN | 0.9 | | | | |
| Example 105 | HP4032 | 100 | 1.48 | 3.7 | 670 | n = 0.06 |
| | HN-5500 | 112 | | | | Bisphenol |
| | CTBN | 10 | | | | A type |
| | DY063 | 0.1 | | | | |
| Example 106 | DER-332 | 100 | 1.45 | 3.6 | 690 | n = 0.13 |
| | HN-5500 | 94 | | | | Bisphenol |
| | CTBN | 10 | | | | A type |
| | DY063 | 0.1 | | | | |
| Example 107 | DY302, 2 | 100 | 1.28 | 3.6 | 720 | n = 2.13 |
| | HN-5500 | 94 | | | | Bisphenol |
| | CTBN | 10 | | | | A type |

TABLE 2-continued

Thermal shrinkage factors of thermosetting resins

| | Resin composition | | Thermal shrinkage factor (%) | Bending strain (% at 4.2 K) | Bending modulus (Kg/mm$^2$ at 4.2 K) | Remarks |
|---|---|---|---|---|---|---|
| | DY063 | 0.1 | | | | |
| Example 108 | DER-332 | 100 | 1.35 | 3.7 | 720 | n = 2.13 |
| | HN-5500 | 94 | | | | Bisphenol |
| | CTBN | 10 | | | | A type |
| | BTPP-K | 0.1 | | | | |
| Example 109 | DER-332 | 100 | 1.38 | 3.7 | 650 | n = 0.02 |
| | HN-5500 | 94 | | | | Bisphenol |
| | CTBN | 10 | | | | A type |
| | TEA-K | 0.9 | | | | |
| Example 110 | DER-332 | 100 | 1.28 | 3.6 | 670 | n = 0.06 |
| | HN-5500 | 94 | | | | Bisphenol |
| | PPG | 10 | | | | A type |
| | BF3-400 | 5 | | | | |
| Example 111 | DER-332 | 100 | 1.17 | 3.6 | 690 | n = 0.13 |
| | HN-5500 | 94 | | | | Bisphenol |
| | PPG | 10 | | | | A type |
| | IOZ | 0.9 | | | | |
| Example 112 | PY302, 2 | 100 | 1.38 | 3.7 | 720 | n = 2.13 |
| | HN-5500 | 94 | | | | Bisphenol |
| | PPG | 10 | | | | A type |
| | 2E4MZ-K | 0.1 | | | | |
| Example 113 | DER-332 | 100 | 1.48 | 3.6 | 720 | n = 2.13 |
| | HN-2200 | 94 | | | | Bisphenol |
| | PPG | 10 | | | | A type |
| | DY063 | 0.1 | | | | |

Curing conditions 100° C./15h + 120° C./15h

| | Resin composition | | Thermal shrinkage factor (%) | Bending strain (% at 4.2 K) | Bending modulus (Kg/mm$^2$ at 4.2 K) | Remarks |
|---|---|---|---|---|---|---|
| Example 114 | PY302, 2 | 100 | 1.28 | 3.6 | 735 | |
| | PPG | 20 | | | | |
| | $BF_3$-400 | 10 | | | | |
| Example 115 | DER-332 | 100 | 1.18 | 3.6 | 720 | |
| | PPG | 20 | | | | |
| | $BF_3$-400 | 10 | | | | |

Curing conditions 90° C./15h + 120° C./15h

As described above, in a superconducting magnet coil impregnated with a curable resin composition giving a cured product having a thermal shrinkage factor of 1.5–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K, particularly a cured product having a thermal shrinkage factor of 1.0–0.3% when cooled from the glass transition temperature to a liquid helium temperature, i.e. 4.2K, a bend-breaking strain of 2.9–3.9% at 4.2K and a modulus of 500–1,000 kg/mm$^2$ at 4.2K, no microcrack is generated in the cured product when the superconducting magnet coil after production is cooled to a liquid helium temperature, i.e. 4.2K. Such a superconducting magnet coil causes substantially no quench even during its operation in which an electromagnetic force is applied.

What is claimed is:

1. A superconducting magnet coil which comprises a coil of a composite superconductor comprising a plurality of thin superconducting wires made of an alloy or intermetallic compound selected from the group consisting of an Nb—Ti alloy, $Nb_3Sn$, $Nb_3Al$ and $V_3Ga$, and a stabilizer selected from the group consisting of copper and aluminum contacting said thin superconducting wires; and a cured product of a curable resin composition comprising at least one epoxy resin selected from the group consisting of diglycidyl ether of bisphenol A, diglycidyl ether of bisphenol F, diglycidyl ether of bisphenol AF and diglycidyl ether of bisphenol AD, all having a number-average molecular weight of 1,000–50,000, with which the coil has been impregnated, the cured product having a thermal shrinkage factor of 1.5–0.3% when cooled from the glass transition temperature to 4.2K, a bend-breaking strain of 2.9–3.9% at 4.2K and a modulus of 500–1,000 kg/m$^2$ at 4.2K.

2. A superconducting magnet coil which comprises a coil of a composite superconductor comprising a plurality of thin superconducting wires made of an alloy or intermetallic compound selected from the group consisting of an Nb—Ti alloy, $Nb_3Sn$, $Nb_3Al$ and $V_3Ga$, and a stabilizer selected from the group consisting of copper and aluminum contacting said thin superconducting wires; and a cured product of a curable resin composition comprising at least one epoxy resin selected from the group consisting of diglycidyl ether of bisphenol A, diglycidyl ether of bisphenol F, diglycidyl ether of bisphenol AF and diglycidyl ether of bisphenol AD, all having a number-average molecular weight of 1,000–50,000, with which the coil has been impregnated, the cured resin composition having a thermal shrinkage factor of 1.5–0.3% when cooled from the glass transition temperature to 4.2K, a bend-breaking strain of 3.2–3.9% at 4.2K and a modulus of 500–1,000 kg/mm$^2$ at 4.2K.

3. The superconducting magnet coil of claim 1 or 2, wherein the thin superconducting wires are covered with at least one member selected from the group consisting of a polyvinyl formal, a polyvinyl butyral, a polyester, a polyurethane, a polyamide, a polyamide-imide and a polyimide.

4. The superconducting magnet coil of claim 1 or 2, wherein the thin superconducting wire are covered with at least one film selected from the group consisting of a polyester film, a polyurethane film, a polyamide film, a polyamide-imide film and a polyimide film.

5. The superconducting magnet coil of claim 1 or 2, wherein the thin superconducting wire are made of a Nb—Ti alloy.

6. The superconducting magnet coil of claim 1 or 2, wherein the curable resin composition comprises:

(a) said at least one epoxy resin (b) a flexibilizer, and (c) a curing catalyst.

7. A superconducting magnet coil which comprises a coil of a composite superconductor comprising a plurality of thin superconducting wires made of an alloy or intermetallic compound selected from the group consisting of an Nb—Ti alloy, $Nb_3Sn$, $Nb_3Al$ and $V_3Ga$, and a stabilizer selected from the group consisting of copper and aluminum contacting said thin superconducting wires; and a cured product of a curable resin composition comprising at least one epoxy resin selected from the group consisting of diglycidyl ether of bisphenol A, diglycidyl ether of bisphenol F, diglycidyl ether of bisphenol AF and diglycidyl ether of bisphenol AD, all having a number-average molecular weight of 1,000–50,000, with which the coil has been impregnated, the cured product undergoing a thermal stress of 0–10 kg/mm$^2$ when cooled from the glass transition temperature to 4.2K and resisting to quench during superconducting operation.

8. A superconducting magnet coil which comprises:

(a) a coil of a composite superconductor comprising a plurality of thin superconducting wires made of an alloy or intermetallic compound selected from the group consisting of an Nb—Ti alloy, $Nb_3Sn$, $Nb_3Al$ and $V_3Ga$, and a stabilizer selected from the group consisting of copper and aluminum contacting the thin superconducting wires, and (b) a cured product of a curable resin composition comprising at least one epoxy resin selected from the group consisting of diglycidyl ether of bisphenol A, diglycidyl ether of bisphenol F, diglycidyl ether of bisphenol AF and diglycidyl ether of bisphenol AD, all having a number-average molecular weight of 1,000–50,000, with which the coil has been impregnated, the cured product having a thermal shrinkage factor of 1.5–0.3% when cooled from the glass transition temperature of 4.2K, a bend-breaking strain of 2.9–4.5% at 4.2K and a modulus of 500–1,000 kg/m$^2$ at 4.2K.

9. The superconducting magnet coil of claim 8, wherein the thin superconducting wires each is made of a Nb—Ti alloy and is covered with at least one film selected from the group consisting of a polyester film, a polyurethane film, a polyamide-imide film and a polyimide film.

10. A superconducting magnet coil which comprises:

(a) a coil of a composite superconductor comprising a plurality of thin superconducting wires made of an alloy or intermetallic compound selected from the group consisting of an Nb—Ti alloy, $Nb_3Sn$, $Nb_3Al$ and $V_3Ga$, and a stabilizer selected from the group consisting of copper and aluminum contacting the thin superconducting wires, and (b) a cured product of a resin composition comprising at least one epoxy resin selected from the group consisting of diglycidyl ether of bisphenol A, diglycidyl ether of bisphenol F, diglycidyl ether of bisphenol AF and diglycidyl ether of bisphenol AD, all having a number-average molecular weight of 1,000–50,000, with which the coil has been impregnated, the cured product undergoing a thermal stress of 0–10 kg/mm$^2$ when cooled from the glass transition temperature to 4.2K and resisting the quench during superconducting operation.

* * * * *